United States Patent [19]

Kuroiwa et al.

[11] Patent Number: 4,981,777
[45] Date of Patent: Jan. 1, 1991

[54] PROCESS FOR PREPARATION OF OPTICAL RECORDING MEDIUM

[75] Inventors: Mitsuyuki Kuroiwa; Koji Tsuzukiyama; Hisaharu Toibana, all of Ichihara, Japan

[73] Assignee: Mitsui Petrochemical Industries, Ltd., Tokyo, Japan

[21] Appl. No.: 272,822

[22] Filed: Nov. 18, 1988

[30] Foreign Application Priority Data

Nov. 20, 1987 [JP] Japan .................. 62-294322
Nov. 20, 1987 [JP] Japan .................. 62-294323
Mar. 4, 1988 [JP] Japan .................. 63-51307

[51] Int. Cl.$^5$ ............... G03C 1/72; G11B 7/26
[52] U.S. Cl. .................. 430/270; 430/290; 430/321; 430/327; 430/945; 427/372.2; 427/383.1; 427/162
[58] Field of Search ............... 430/270, 290, 495, 346, 430/945, 320, 321, 327; 346/135.1; 428/64, 65; 427/162, 164, 383.1, 372.2

[56] References Cited

U.S. PATENT DOCUMENTS 4,629,649 12/1986 Osaka et al. .................. 430/945
4,670,345 6/1987 Morimoto et al. ............. 346/76 L

FOREIGN PATENT DOCUMENTS 0212336 7/1986 European Pat. Off. .
2035888 2/1987 Japan .................. 430/945
2170044 7/1987 Japan .................. 428/64
2286796 12/1987 Japan .................. 428/64
3119041 5/1988 Japan .................. 428/64

OTHER PUBLICATIONS

Japanese Abstract JP-A-58 71 195, vol. 7, No. 165, Tokyo Shibaura Denki, 7/20/83.
Japanese Abstract JP-A-61 20 719, vol. 10, No. 171, Asahi Kasei Kogyo, 6/17/86.
Japanese Abstract JP-A-58 151 222, vol. 7, No. 271, Mippon Denshin Denwa Kosha, 12/03/83.
J58/009234, Abstract, 01/19/83, Tokyo Shibaura Elec. Ltd.
J58/071195, Abstract, 04/27/83, Tokyo Shibaura Elec. Ltd.

Primary Examiner—Paul R. Michl
Assistant Examiner—Lee C. Wright
Attorney, Agent, or Firm—Sherman and Shalloway

[57] ABSTRACT

A process for the preparation of an optical recording medium, which comprises forming a thin optical recording film comprising at least one low melting point metal, carbon and hydrogen on a substrate, and heat treating the so formed film on said substrate at a temperature of from 70° to 300° C. for a period of at least 5 seconds. The optical recording medium so prepared has an enhanced recording sensitivity and a prolonged service life.

14 Claims, 4 Drawing Sheets

PROCESS FOR PREPARATION OF OPTICAL RECORDING MEDIUM

FIELD OF THE INVENTION

The present invention relates to a process for the preparation of an optical recording medium comprising a substrate and an optical recording film supported on said substrate, said medium being capable of recording information by forming portions of changed physical configuration or changed optical characteristics in said film by irradiation of an energy beam such as light or heat so that the arrangement of said portions may correspond to the information to be recorded. More particularly, it relates to a process for the preparation of such an optical recording medium which has a prolonged service life and an enhanced recording sensitivity.

BACKGROUND OF THE INVENTION AND RELATED ART

There are two kinds of optical recording system. According to one system, portions having changed physical configurations such as holes and pits are formed in an optical recording film by irradiation of an energy beam so that the arrangement of said portions may correspond to information to be recorded. Whereas according to another system, portions having changed optical characteristics such as changed refractive index or reflectance are formed in an optical recording film by irradiation of an energy beam, the arrangement of said portions corresponding to information to be recorded.

Known in the art are recording films primarily composed of a low melting point metal such as tellurium (Te) for use in optical recording media of the both systems (Japanese Patent Laid-open Publications Nos. 58-71195 and 58-9234). Te films, typical low melting point metal films, are capable of forming therein desired portions of changed physical configurations or portions of changed optical characteristics (such portions will be generally referred to herein as pits), and are very promising high sensitive materials. By the term "recording sensitivity" used herein, we mean an energy $(nJ/\mu m^2)$ required for forming pits per unit area.

When Te is allowed to stand in ambient atmosphere, however, Te is oxidized by oxygen or moisture, and becomes transparent due to increase in transmission. When such Te is used as an optical recording film, the thickness of the film is as thin as several hudreds of Å. Accordingly, if the transmission of the film is increased due to oxidation of Te, the recording sensitivity of the film is remarkably reduced. More particularly, when a thin Te film is oxidized, the melting and evaporation temperatures of the material are increased on the one hand, and due to the fact that the film has become transparent the absorption of energy such as light by the film is decreased, leading to an increased energy level required for formation of pits on the other hand. As a result the recording sensitivity of the film is remarkably reduced. For example, when a Te film is allowed to stand in an atmosphere maintained at a temperature of 70° C. and a relative humidity of 85%, the recording sensitivity of the film is reduced by about 20% in about 5 hours and by about 50% in about 15 hours.

To solve the problems discussed above, various attempts have been made for the purpose of inhibiting oxidation of a Te film. There is known a procedure in which a Te film is coated with a stable inorganic material.

While this procedure is effective for inhibiting oxidation of the Te film, it is not commercially practiced since it does lower the recording sensitivity of the film and is expensive. Also known is a procedure in which a Te film is coated with a plastic material. The latter mentioned procedure is advantageous in that it does not badly affect the recording sensitivity of the film because of a low heat conductivity of the plastic material. However, oxidation of the Te film is not sufficiently inhibited because the plastic material is relatively readily permeated by oxygen and moisture.

Further, while the recording sensitivity of a recording film comprising a low melting point metal such as Te can be said high, it is not sufficiently high, and thus, optical recording films having a further improved recording sensitivity are desired in the art.

OBJECT OF THE INVENTION

An object of the invention is to provide a process for the preparation of an optical recording medium which is highly sensitive so that it is capable of recording information with a reduced energy, and which has a prolonged service life.

SUMMARY OF THE INVENTION

A process according to the invention for the preparation of an optical recording medium comprising a substrate and an optical recording film supported on said substrate, said medium being capable of recording information by forming portions of changed physical configurations or changed optical characteristics in said film by irradiation of an energy beam so that the arrangement of said changed portions may correspond to the information to be recorded, comprises forming a thin optical recording film comprising as essential elements (1) at least one low melting point metal element, (2) carbon and (3) hydrogen on said substrate, and heat treating the so formed film on said substrate at a temperature of from 70° to 300° C. for a period of at least 5 seconds.

The optical recording medium prepared by the process according to the invention has a prolonged service life and is highly sensitive in that an energy required for forming pits per unit area is reduced because the heat treated recording film in itself has an enhanced durability.

DETAILED DESCRIPTION OF THE INVENTION

The invention will now be described in detail.

Formation of Recording Film

Figure 1:
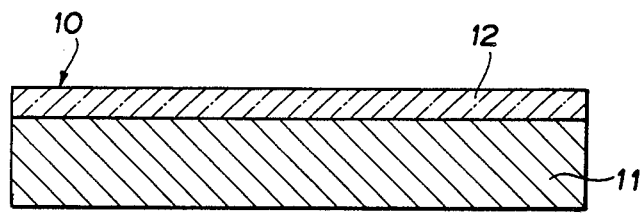
FIG. 1 is a schematic cross-sectional view for illustrating an optical recording medium prepared by the process according to the invention.

As shown in FIG. 1, in the process according to the invention an optical recording medium 10 is constructed by coating a substrate 11 on one surface thereof with an optical recording film 12.

Examples of a material for constituting the substrate 11 include, for example, inorganic materials such as glass and aluminum; as well as organic materials such as polymethyl methacrylates, polycarbonates, polymer alloys of polycarbonates and polystyrenes, amorphous polyolefins as disclosed in U.S. Pat. No. 4,614,778, poly (4-methyl-1-pentene), epoxy resins, polyetherpolysulfones, polysulfones and polyetherimides. The thickness of the substrate 11 is such that it may provide the recording medium as a whole with an appropriate rigidness and may be preferably from 0.5 to 2.5 mm, and more preferably from 1 to 1.5 mm.

The optical recording film 12 comprises at least one low melting point metal element, carbon (C) and hydrogen (H), and when irradiated with an energy beam, such as a laser beam, on-off modulated in accordance with information to be recorded, pits are formed in those portions of the film where irradiated. The pits may be changed physical configurations such as holes or depressions, or may be portions where optical characteristics such as refractive index or reflectance have been changed. The thickness of the recording film 12 should be thick enough to provide a sufficient reflectance and should be thin enough not to impair a recording sensitivity of the film. It is normally on the order of from 100 Å to 1 μm, preferably from 200 to 500 Å.

As low melting point metal element in the recording film 12, tellurium (Te), bismuth (Bi), zinc (Zn), cadmium (Cd), lead (Pb) and tin (Sn) may used alone or in combination. Of these, tellurium is particularly preferred.

The content of the low melting point metal such as Te in the recording film 12 is preferably from 40 to 90 atom % based on the whole film.

In addition to the low melting point metal described above, the recording film 12 may further comprise another metal such as antimony (Sb), or selenium (Se).

In the case wherein the recording film 12 contains Sb as the above-mentioned another metal, the content of Sb should normally be not more than 60 atom %, preferably not more than 40 atom %, and more preferably from 1 to 25 atom % based on the whole film. It has been found that incorporation of such an amount of Sb into the recording film substantially eliminates changes of the transmission of the film with time, whereby the durability of the film may be enhanced and the service life of the film may be lengthened.

In the case wherein the recording film 12 contains Se in addition to Te, the content of Se is such that when the atomic proportions of Te and Se contained in the film is represented by the formula $Te_xSe_{1-x}$, X satisfies $0.4 < X < 0.99$, preferably $0.5 < X < 0.97$, and more preferably $0.6 < X < 0.95$. It has been found that incorporation of such an amount of Se into the recording film is very effective for inhibition of oxidation of the film.

The C content of the recording film 12 is preferably from 5 to 40 atom % based on the whole film. With substantially less than 5 atom % of C appreciable improvement in the service life will not be achieved over a recording film consisting essentially of a low melting point metal. On the other hand a high content of C substantially in excess of 40 atom % should be avoided, or otherwise the recording sensitivity of the film will be adversely affected.

The H content of the recording film 12 is preferably from 5 to 40 atom % based on the whole film from the view point of the service life.

Metallic elements contained in the recording film can be determined by ICP (induction coupling plasma) emission spectroscopic analysis, while carbon and hydrogen in the film can be determined by organic elemental analysis.

The recording film 12 can be formed on a surface of the substrate 11 by various dry coating methods known per se.

For example, a thin film of Te containing C and H as the recording film 12 can be formed on the substrate 11, by carrying out a reactive sputtering process in a mixed gas of argon and an organic gas such as $CH_4$ and $C_2H_2$, containing C and H, using Te as a target. Alternatively, the thin film of Te containing C and H can be formed on the substrate 11, by ion plating process chemical, vapor deposition or plasma vapor phase epitaxy. These dry coating methods can also be utilized for forming a thin film of an alloy of Te with other metal or metals, a low melting point metal other than Te or its alloy, containing C and H as prescribed herein.

In cases wherein a thin recording film 12 of a low melting point alloy containing C and H is formed on a substrate 11 by a sputter ion plating process, contents of C and H in the formed film may be adjusted at will by selecting a ratio of an organic gas such as $CH_4$ to Ar in the mixed gas atmosphere and a high frequency electric power to be imposed. For example, in a case wherein $CH_4/Ar$ is 1 and a high frequency (13.56 MHz) electric power of about 0.3 W/cm$^2$ is imposed between a Te target and the substrate 11, a film containing 0.2 atom of C per atom of Te can be formed. While the optimum H content rendering the formed film chemically most stable depends upon the particular C content, the H content may be selected within the range prescribed herein above provided that too much amount of H that may evolve hydrogen gas in the film being formed is not incorporated into the film. The thickness of the recording film 12 can easily be controlled, since it is proportional to the sputtering time.

Optical characteristics such as reflectance and extinction coefficient of the recording film 12 which has been formed as described above depend upon the C and H contents of the film. When the film is used for recording and reading out information, the thickness of the film is selected in accordance with desired optical characteristics. As a result of experiments it has been found that a suitable thickness of the film 12 is within the range of from 100 Å to 1 μm, and preferably within the range of from 200 to 500 Å, as described herein above. The film formed under the conditions described above is amorphous. When portions of changed physical configurations are formed to record information on such a film containing C and H in addition to a low melting point metal, edges of the formed changed physical configurations are smoother than those formed on a film consisting essentially of a low melting point metal, whereby a noise level for reading out the recorded information from the former film may be advantageously low. Incidentally, when portions of changed optical characteristics are formed to record information, there is no problem of increase in noise level for reading out the information due to changes of physical configurations since physical configurations of pits are not changed.

Heat Treatment

The recording film 12 formed on the substrate 11 is then heat treated in an atmosphere of an inert gas, reducing gas or an inert gas of a reduced pressure containing oxygen more or less. The heat treatment is carried out at a temperature within the range of from 70° C. to 300° C., well below the melting point of the low melting point metal contained in the film 12. A preferred heat treatment temperature is from 90° C. to 300° C. The heat treatment is carried out for a period of at least 5 seconds, normally from 5 seconds to 1000 minutes, and preferably from 5 to 100 minutes. It has been found that the recording sensitivity of the recording film can be enhanced by the heat treatment according to the invention. By the term "enhanced recording sensitivity" is meant reduction in energy of an energy beam such as a laser light required for recording information in unit area of the recording film.

EFFECT OF THE INVENTION

The optical recording medium prepared by the process according to the invention which has been heat treated has an enhanced recording sensitivity. Further, it has a prolonged service life, since the recording film used therein contains C and H and thus has an improved durability. Moreover, since the recording film itself is durable, moisture or oxygen permeable acrylic or other inexpensive plastic substrates can be safely utilized, rendering the process inexpensive and suitable for mass-production of optical recording media.

The invention will be further described by the following Examples which illustrate the process according to the invention and the following Comparative Examples which are outside the scope of the invention. It should be appreciated, however, that the invention is by no means restricted to the Examples.

EXAMPLE 1

A recording film 12 having a thickness of 250 Å and consisting essentially of 60 atom % of Te, 15 atom % of C and 25 atom % of H was formed on a substrate 11 in a mixed gas of $CH_4$ and Ar (1:4 by volume) by a reactive sputtering process in which a target consisting essentially of Te was used. The recording film 12 so formed was allowed to stand in a nitrogen atmosphere maintained at a temperature of 100° C. for a period of 20 minutes. The product so prepared was an optical recording medium which forms a pattern of changed physical configurations when information is recorded thereon by means of a laser beam modulated in accordance with the information.

EXAMPLE 2

Example 1 was repeated except that the thickness of the recording film 12 was 350 Å. Thus, the product had a recording film 12 having a thickness of 350 Å and consisting essentially of 60 atom % of Te, 15 atom % of C and 25 atom % of H.

COMPARATIVE EXAMPLE 1

Example 1 was repeated except that the heat treatment was not carried out.

COMPARATIVE EXAMPLE 2

Example 2 was repeated except that the heat treatment was not carried out.

The Optical recording media so prepared were tested for the recording sensitivity ($nJ/\mu m^2$), using a laser beam of a frequency of 1 MHz. The recording sensitivity is an energy of a laser beam required for forming pits to record information per unit area of the film, and the lower the energy the better the recording sensitivity. Results are shown in Table 1.

TABLE 1

|  | Film thickness (Å) | Sensitivity ($nJ/\mu m^2$) |
| --- | --- | --- |
| Example 1 | 250 | 0.68 |
| Comp. Ex. 1 | 250 | 0.80 |
| Example 2 | 350 | 0.80 |
| Comp. Ex. 2 | 350 | 1.00 |

Table 1 reveals that the heat treatment according to the invention improves the recording sensitivity by more than 10%.

EXAMPLE 3

Using a target of an Te-Sb alloy, a recording film 12 having a thickness of 250 Å and consisting essentially of 55.2 atom % of Te, 4.8 atom % of Sb, 15 atom % of C and 25 atom % of H was formed on a substrate 11 in a mixed gas of $CH_4$ and Ar (1:4 by volume) by a reactive sputtering process. The recording film 12 so formed was allowed to stand in a nitrogen atmosphere maintained at a temperature of 100° C. for a period of 20 minutes. The product so prepared was an optical recording medium which forms a pattern of changed physical configurations when information is recorded thereon by means of a laser beam modulated in accordance with the information.

COMPARATIVE EXAMPLE 3

Example 3 was repeated except that the heat treatment was not carried out.

The Optical recording media so prepared were tested for the recording sensitivity ($nJ/\mu m^2$), using a laser beam of a frequency of 1 MHz. Results are shown in Table 2.

TABLE 2

|  | Film thickness (Å) | Sensitivity ($nJ/\mu m^2$) |
| --- | --- | --- |
| Example 3 | 250 | 0.70 |
| Comp. Ex. 3 | 250 | 0.80 |

Table 2 reveals that the heat treatment according to the invention improves the recording sensitivity by more than 10%.

The optical recording media prepared in Example 3 and comparative Example 1 were allowed to stand in an atmosphere of a temperature of 70° C., and a relative humidity of 90% for a period of 1000 hours. Percent decrease in transmission of the recording film was determined for each tested medium. Results are shown in Table 3.

TABLE 3

|  | % Decrease in transmission |
| --- | --- |
| Example 3 | 0% |
| Comp. Ex. 1 | 15% |

Table 3 reveals that the recording medium prepared in Example 3 according to the invention did not undergo any decrease in transmission of the recording film even with a lapse of 1000 hours. Whereas the recording medium of Comparative Example 1 underwent a substantial decrease in transmission of the recording film. The film of the latter medium had become more or less dark. This is believed due to oxidation of Te. Decrease in transmission with time is disadvantageous since it necessiates minute adjustment of a beam energy for recording and reading out.

EXAMPLE 4

Figure 2:
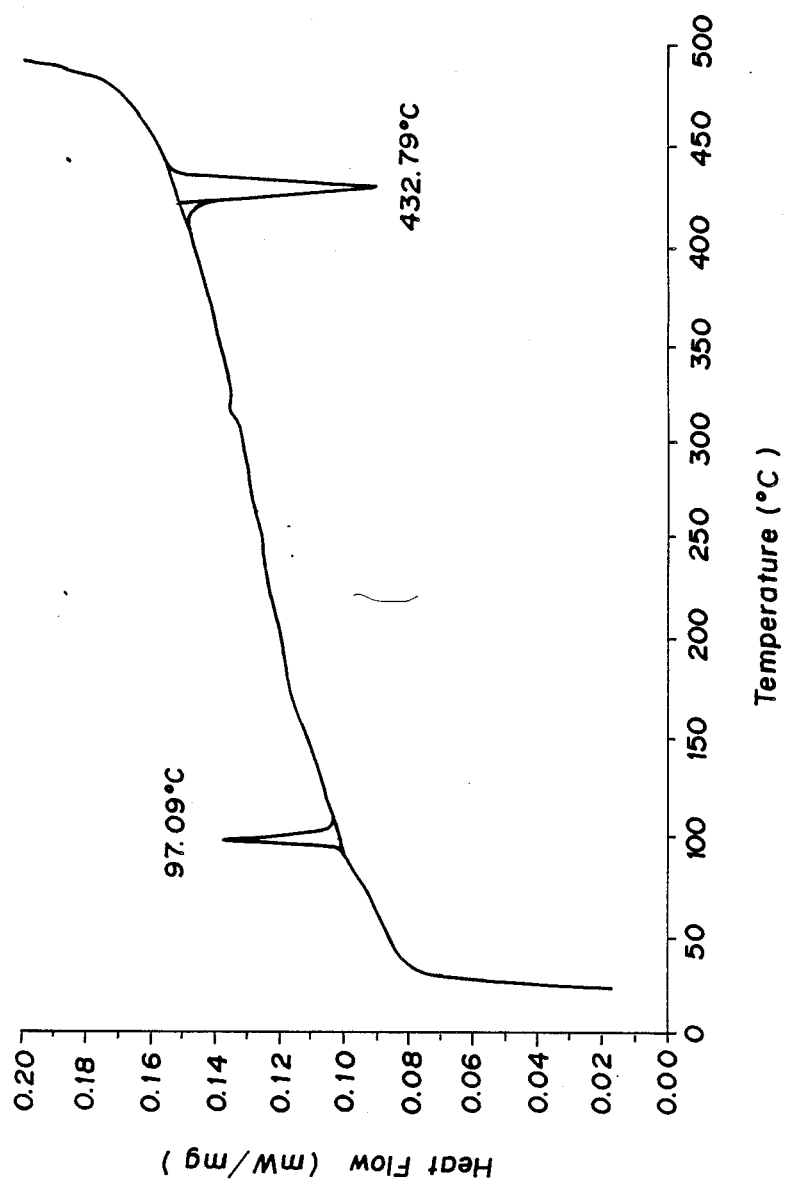
FIG. 2 is a curve showing a result of differential scanning calorimetry on a Te-Se film of Example 4 before heat treatment.

A methane/argon-plasma sputtered film of a Te-Se alloy containing C and H having a thickness of 250 Å was formed on a substrate by a reactive sputtering process in a mixed gas atmosphere of Ar and $CH_4$ in a vacuum chamber maintained under a pressure of about 5 mTorr., using a target of a Te-Se alloy, $Te_{60}Se_{40}$ (numerals indicate atomic percentages and so forth on). The ratio of flow rate of Ar and $CH_4$ to the vacuum container was 1:1. ICP emission spectroscopic analysis of the film indicated the composition of metallic ingredients of the film as being $Te_{75}Se_{25}$. The film as formed was subjected to differential scanning calorimetry (DSC), the result of which is shown in FIG. 2. In the DSC curve of the film as formed an exotherm peak is observed at a temperature of about 100° C.

Figure 3:
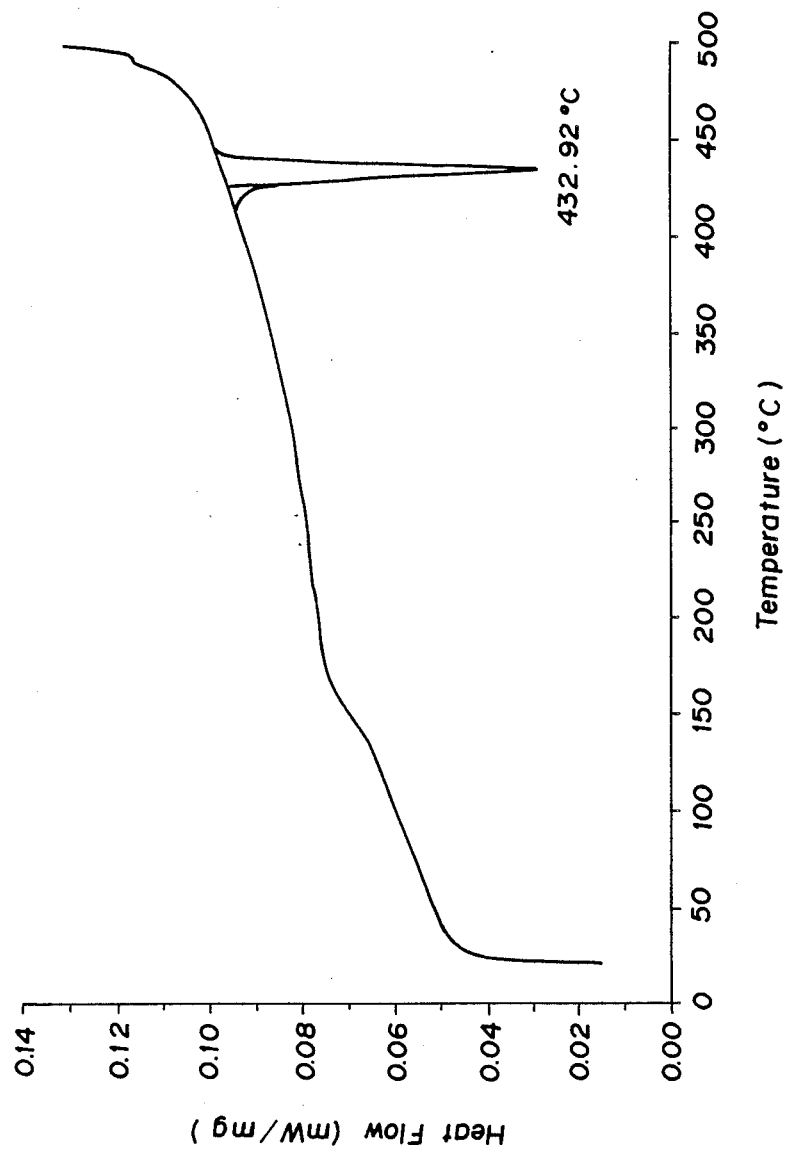
FIG. 3 is a curve showing a result of differential scanning calorimetry on a Te-Se film of Example 4 after heat treatment.

The film so formed was heat treated in a vacuum oven at a temperature of 85° C. for a period of about 24 hours. The heat treated film was subjected to DSC. The result is shown in FIG. 3. It is revealed from FIG. 3 that the exotherm peak near 100° C. has disappeared by the heat treatment. This is believed because the film has been crystallized by the heat treatment.

Optical constants (refractive index and extinction coefficient) of the film at a wave length of 780 nm were determined before and after the heat treatment. The film had a refractive index of 3.0 and an extinction coefficient of $-0.25$ before the heat treatment, and a refractive index of 3.4 and an extinction coefficient of $-0.91$ after the heat treatment. It has been confirmed that the optical constants of the film change by the heat treatment.

Figure 4:
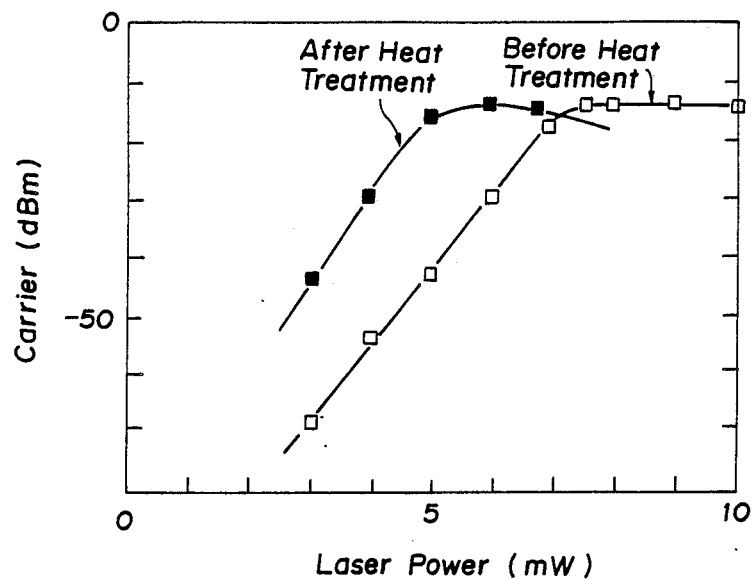
FIG. 4 is a graphical showing of recording and reading out characteristics before and after heat treatment on an optical recording medium of Example 4.

The same film of a thickness of 250 Å was formed on a substrate of an amorphous polyolefin having pregrooves, and tested for characteristics of recording and reading out information before and after the heat treatment. In the test information was recorded using a laser light of a recording frequency of 5.4 MHz with a linear velosity of 9.4 m/s and an irradiation time of 50 ns. FIG. 4 is a graphical showing of the test results, in which the signal level (carrier) at the time of reading out is plotted against the laser power at the time of recording. In the curves of FIG. 4 it is meant that the more nearly the carrier approaches 0, the more completely pits have been formed upon recording information. It is revealed from FIG. 4 that on the film which has been heat treated according to the invention pits have been approximately completely formed with a laser power of about 5 mW, while the comparative film before the heat treatment requires a laser power of at least about 7.5 mW to form pits of the same quality. The heat treated film was allowed to stand in an atmosphere of 70° C. and 90% relative humidity for a period of 1000 hours. No changes in the reflectance and transmission were observed.

What is claimed is:

1. A process for the preparation of an optical recording medium comprising a substrate and an optical recording film supported on said substrate, said medium being capable of recording information by forming portions of changed physical configurations or optical characteristics in said film by irradiation of energy beams so that the arrangement of said changed portions may correspond to the information to be recorded, which process comprises forming a thin optical recording film comprising at least one low melting point metal element, carbon and hydrogen on said substrate, and heat treating the so formed film on said substrate at a temperature of from 70° to 300° C. for a period of at least 5 seconds.

2. The process according to claim 1 wherein said low melting metal element is selected from tellurium, bismuth, zinc, cadmium, indium, lead, tin and alloys of at least two of them.

3. The process according to claim 2 wherein said low melting metal element is tellurium.

4. The process according to claim 1 wherein said optical recording film further comprises another metal in addition to said low melting point metal element, carbon and hydrogen.

5. The process according to claim 4 wherein said another metal is antimony.

6. The process according to claim 4 wherein said another metal is selenium.

7. The process according to claim 1 wherein the heat treatment is carried out in an atmosphere of a reducing gas.

8. The process according to claim 1 wherein the heat treatment is carried out in an atmosphere of a reducing gas.

9. The process according to claim 1 wherein the heat treating is carried out at a temperature of 90° to 300° C. for from 5 seconds to 1,000 minutes.

10. The process according to claim 9 wherein the heat treating is carried out for a period of from about 5 to 100 minutes.

11. The process according to claim 4 wherein the optical recording film contains Te, C and H in amounts of 40 to 90 atom percent, 5 to 40 atom percent, and 5 to 40 atom percent, respectively.

12. The process according to claim 5 wherein the amount of antimony in the optical recording film is from about 1 to 25 atom percent.

13. The process according to claim 6 wherein the content of Se is such that when the atomic proportion of Te and Se is represented by the formula $Te_xSe_{1-x}$, x is greater than 0.4 and less than 0.99.

14. The process according to claim 7 wherein x is greater than 0.5 and less than 0.97.

* * * * *